United States Patent
Iny et al.

[19]

[11] Patent Number: 5,813,504
[45] Date of Patent: Sep. 29, 1998

[54] REMOVABLE HANDLE ASSEMBLY FOR LUGGAGE

[76] Inventors: Joseph Iny, 306 Barton Ave., Ville Mont-Royal Québec, Canada, H3P 1N1; Albert Amar, 765 place Stewart, Ville St-Laurent Québec, Canada, H4M 2X2

[21] Appl. No.: 800,183

[22] Filed: Feb. 13, 1997

[51] Int. Cl.⁶ .............................. A45C 13/22; A45C 13/26
[52] U.S. Cl. ........................ 190/116; 190/115; 16/112 R; 16/115
[58] Field of Search ................................... 16/112 R, 115; 294/27 A; 190/18 A, 39, 115–118

[56] References Cited

U.S. PATENT DOCUMENTS

| | | | |
|---|---|---|---|
| 1,128,573 | 2/1915 | Beck et al. | 190/116 X |
| 1,241,890 | 10/1917 | Schrader | 190/116 |
| 1,616,632 | 2/1927 | Mastrontonio | 190/115 X |
| 2,537,750 | 1/1951 | Gretschel | 190/116 |
| 2,784,816 | 3/1957 | Goldberg | 190/115 |
| 3,484,894 | 12/1969 | Fletcher . | |
| 3,790,232 | 2/1974 | Alvarez | 403/192 |
| 3,854,558 | 12/1974 | Corson | 190/118 X |
| 3,895,696 | 7/1975 | Urushibara | 190/18 A X |
| 4,094,391 | 6/1978 | Ratchford | 190/18 A |
| 4,135,725 | 1/1979 | Diroma | 280/47.26 |
| 4,160,495 | 7/1979 | Conard | 190/18 A |
| 4,299,313 | 11/1981 | Null | 190/18 A |
| 4,433,760 | 2/1984 | Pelavin | 190/115 |
| 4,759,431 | 7/1988 | King et al. | 190/18 A |
| 4,827,567 | 5/1989 | Beach | 16/114 R |
| 4,848,782 | 7/1989 | Schmidt | 190/18 A X |
| 4,995,487 | 2/1991 | Plath | 190/18 A |
| 5,042,676 | 8/1991 | Gohlke | 220/94 R |
| 5,178,404 | 1/1993 | Chen | 280/655 |
| 5,180,179 | 1/1993 | Salvucci | 280/47.315 |
| 5,197,579 | 3/1993 | Bieber et al. | 190/18 A |
| 5,323,886 | 6/1994 | Chen | 190/18 A |
| 5,464,081 | 11/1995 | Zwanzig | 190/115 |
| 5,499,702 | 3/1996 | Wang | 190/115 |
| 5,526,908 | 6/1996 | Wang | 190/115 |
| 5,531,300 | 7/1996 | Tsai | 190/115 |
| 5,577,611 | 11/1996 | Greenall | 190/101 X |

FOREIGN PATENT DOCUMENTS

| | | |
|---|---|---|
| 58192/80 | 11/1980 | Australia . |
| 0 351 232 | 1/1990 | European Pat. Off. . |
| 2 658 790 | 8/1991 | France . |
| 23 31 837 | 1/1975 | Germany . |

*Primary Examiner*—Sue A. Weaver

[57] ABSTRACT

The removable handle assembly comprises a first member to be connected to the luggage, such as briefcases, suitcases, catalog cases, attache cases, trunks, either made of a rigid shell or a trim with an inner frame. The assembly further comprises a second member provided with a hand-grip. The second member is removably connectable to the first member in a locking engagement. One advantage of such arrangement is that the second member can be carried away or safely stored inside the luggage when it is not needed, such as when the luggage is in the trunk of a vehicle or left at the baggage check-in counter in an airport. Moreover, it has the advantages of being low in costs and low in weight. No outside frame pipe is in the way and no additional inside frame pipe retrieves space in the luggage.

6 Claims, 6 Drawing Sheets

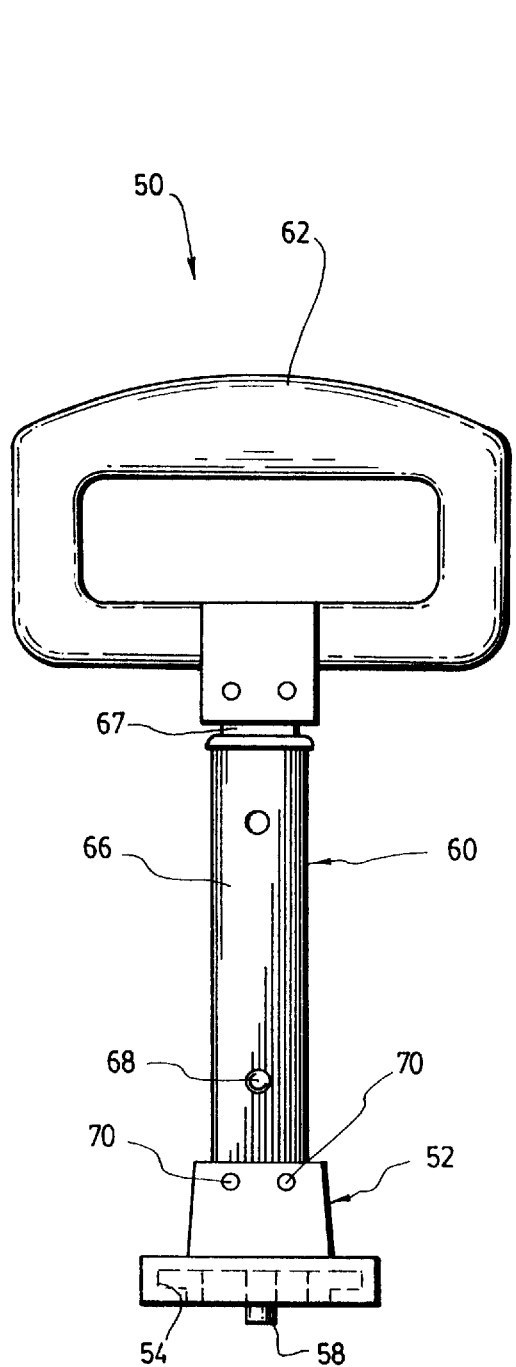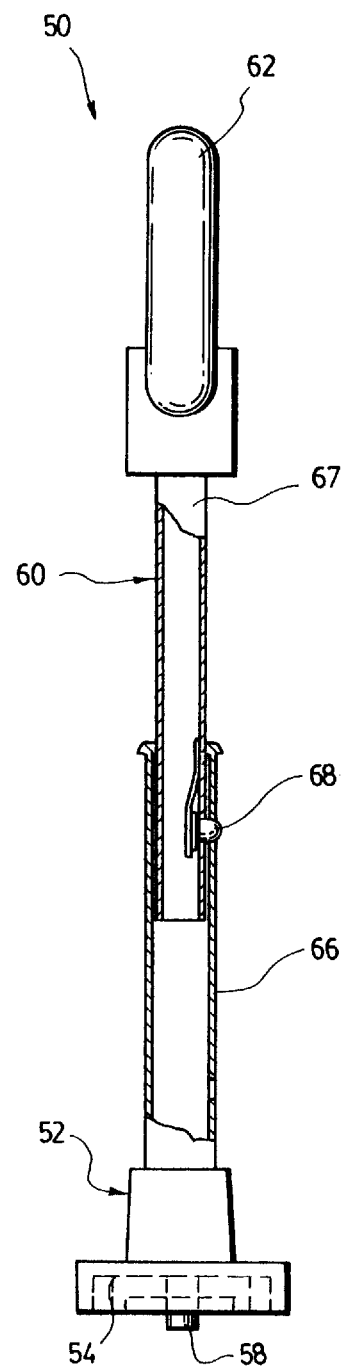
FIG. 8
FIG. 9

REMOVABLE HANDLE ASSEMBLY FOR LUGGAGE

PRIOR U.S. APPLICATION

The present application claims priority of U.S. provisional application Ser. No. 60/023,343, filed 23, Aug. 1996, now abandoned.

BACKGROUND

Most luggage used by travellers is fitted with wheels for pulling them between locations, such as airports, train stations, etc. Flexible and removable straps have been used for some time for pulling luggage too heavy or too cumbersome to be transported by hand. However, these straps are not very practical since a luggage pulled with a strap is generally not very stable, even on a flat surface. Most present travellers prefer luggage provided with a built-in trolley comprising a collapsible handle. The latter is more convenient for large modern airports with very long concourses, especially for use as a carry-on luggage.

There are many models of luggage with a built-in trolley. Some have an outer frame while others have the frame within the luggage itself and hidden inside an interior pocket. In the first case, the outer frame pipes are subjected to important damages during manipulation. It also requires more space to store the luggage. As for luggage with the inside frame, the main drawback is that some vital inside space is lost. In all instances, the frame of the built-in trolley adds to weight of the luggage and to the manufacturing costs.

SUMMARY

It is an object of the present invention to provide a removable handle assembly for replacing the built-in trolley and corresponding frame structure of conventional luggage while still enjoying the benefits of a trolley-like luggage.

According to the present invention, there is provided a removable handle assembly for luggage or the like, the assembly comprising a first member to be connected to the luggage, a second member that comprises a hand-grip, and a connecting means for removably connecting the second member to the first member in a locking engagement.

A non restrictive description of a preferred embodiment will now be given with reference to the appended drawings.

BRIEF DESCRIPTION OF THE DRAWINGS

FIG. 8 is a front view of an example of a telescopic hand-grip according to a preferred embodiment of the present invention, shown in the retracted position.

FIG. 9 is a partial cross-sectional view of the hand-grip of FIG. 8, shown in the extended position.

IDENTIFICATION OF THE COMPONENTS

Figure 1:
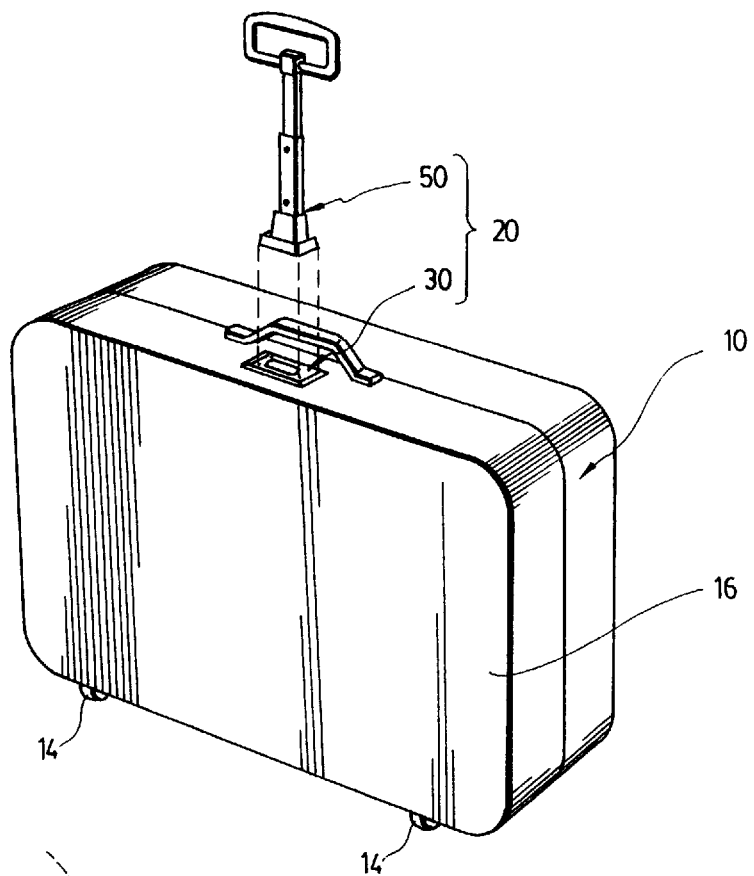
FIG. 1 is a side perspective view of a removable handle assembly for luggage according to a preferred embodiment of the present invention, showing the second member when separated from the first member.

The following is a list of the reference numerals, along with the names of the corresponding components, that are used in the appended drawings and in the description.

10 luggage
12 inner frame (of the luggage)
14 wheels (of the luggage)
16 trim (of the luggage)
18 bearing plate
20 removable handle assembly
30 first member
32 rectangular projecting part (of the first member)
34 slots
36 flanges (of the rectangular projecting part)
38 alignment hole
40 holes
42 fasteners
50 second member
52 base portion
54 flanged socket
54A curved portions (of the socket)
54B straight portions (of the socket)
55 flanges
56 slots
58 alignment peg
60 collapsible hand-grip
62 closed loop
64 telescopic handle
66 sleeve
67 sliding inner element
68 locking knob
70 rivets
80 bosses
82 shallow bores

DESCRIPTION

The Luggage

Figure 2:
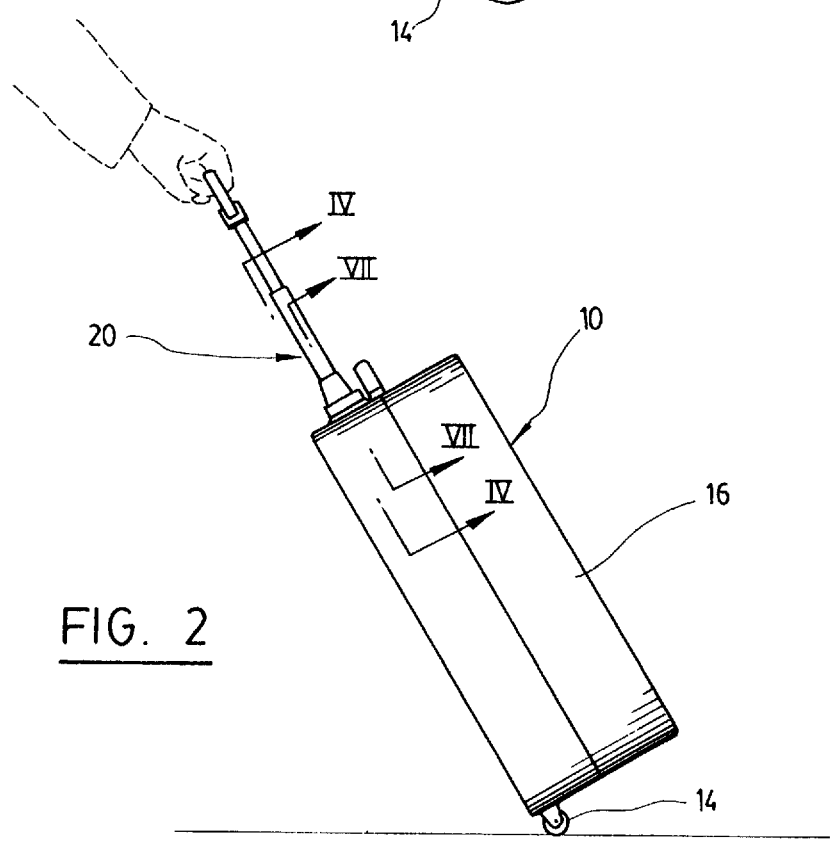
FIG. 2 is a side view of the assembly of FIG. 1, showing the second member connected to the first member.

FIGS. 1 and 2 show an example of a luggage (10) on which the removable handle assembly (20) according to the present invention can be used. The term "luggage" within the meaning of the present description and the appended claims is a generic term for all items such as briefcases, suitcases, catalog cases, attache cases, trunks or the like, either made of a rigid shell or a trim covering an inner frame. It is mainly directed towards luggage provided with wheels at the bottom. However, it is possible to use the present invention with a light luggage without wheels.

Figure 4:
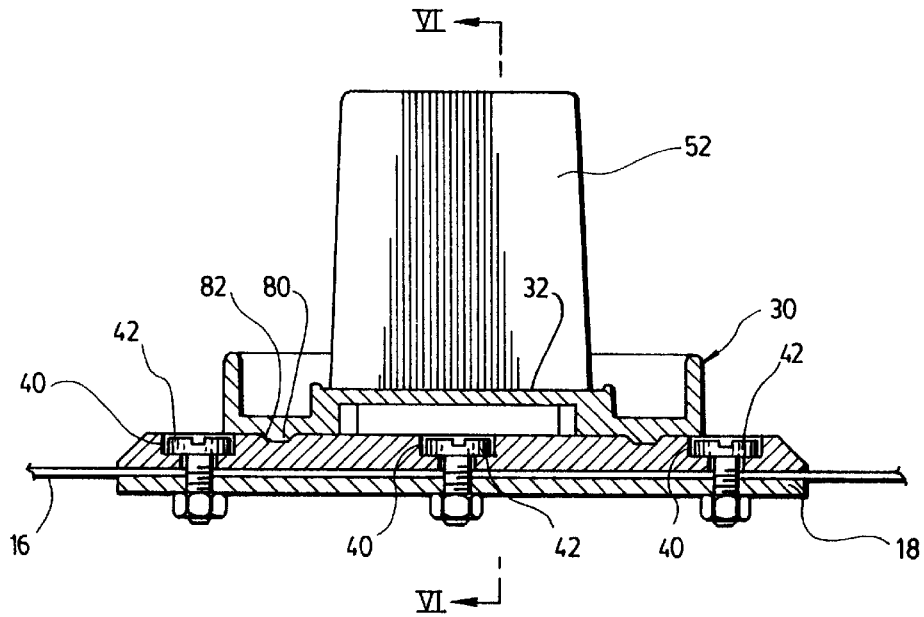
FIG. 4 is a cross-sectional view of the first and the second member according to line IV—IV of FIG. 2, showing the second member connected to the first member and the first member connected to the bearing plate.
Figure 5:
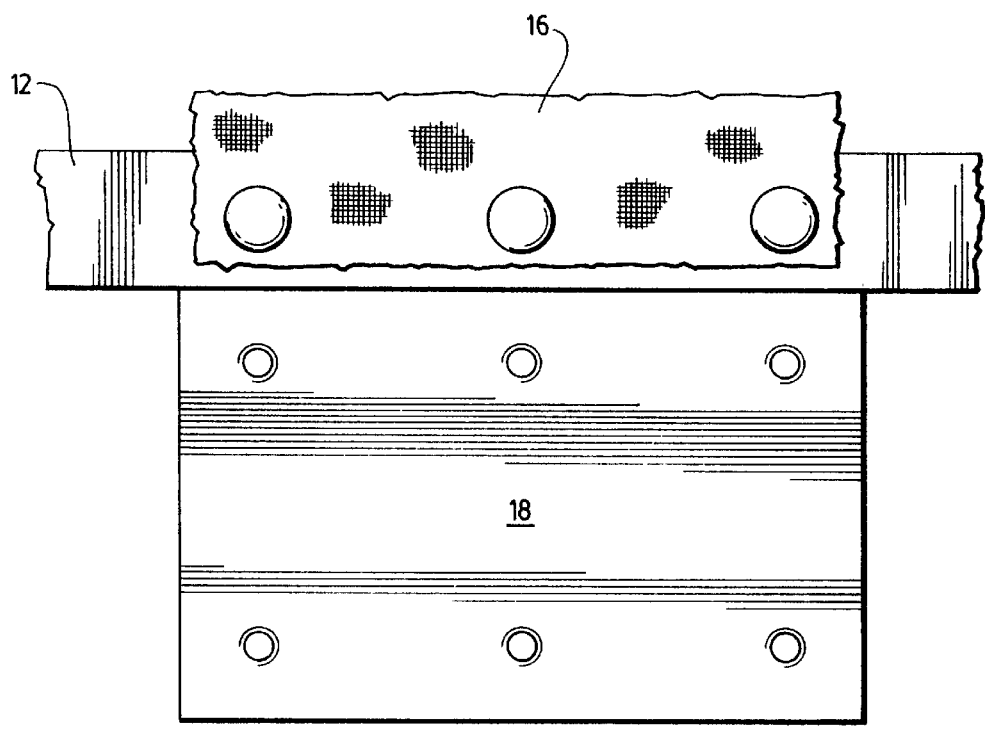
FIG. 5 is a top view of a bearing plate in the luggage of FIG. 1.
Figure 6:
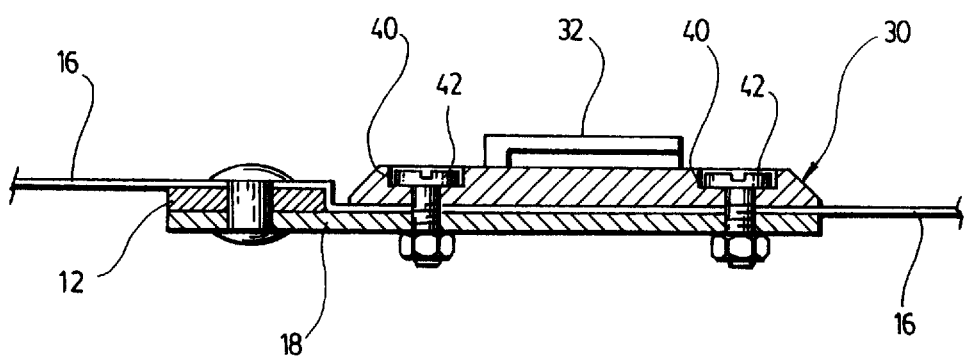
FIG. 6 is a cross-sectional view of the first member according to line VI—VI of FIG. 4, showing the bearing plate and the frame of the luggage.

As shown in FIGS. 4 to 6, the luggage (10) shown in FIGS. 1 and 2 is of the type having a conventional inner rim-like frame (12) with corresponding reinforcing corners (not shown). Small bottom wheels (14) are connected to the lower portion of the frame (12) and a trim (16) covers what defines the inner compartment. Alternatively, the luggage may have an outer rigid shell with or without a frame.

The Assembly

According to the present invention, and as shown in the drawings, the removable handle assembly (20) comprises a first member (30) to be connected to the luggage (10), a second member (50) that comprises a hand-grip (60), and a connecting means for removably connecting the second member (50) to the first member (30) in a locking engagement. One advantage of such arrangement is that the second member (50) can be carried away or safely stored inside the luggage (10) when it is not needed, such as when the luggage (10) is in the trunk of a vehicle or left at the baggage check-in counter in an airport. Moreover, it has the advantages of being low in costs and low in weight. No outside frame pipe is in the way and no additional inside frame pipe retrieves space inside the luggage.

Another interesting advantage of the present invention is that the luggage (10) may be pulled sidewards, as shown in FIG. 2, instead of being pulled longitudinally, as done hitherto with conventional straps. The luggage (10) is more stable when pulled sidewards. Yet, this is very useful for catalog cases, which are small rectangular suitcases for transporting bulky documents and often used by lawyers or sales representatives. Some catalog cases are provided with wheels to haul them whenever they are too heavy to be lifted and transported by hand. A strap or a built-in handle is usually provided on the side for longitudinal transportation and wheels are located at the opposite side so that the length of the catalog case reduces the required length of the strap or of the handle. However, and as aforesaid, this conventional arrangement does not make the catalog case very stable when pulled. To resolve this problem, one can use the present invention with the telescopic hand-grip and set the wheels so that the catalog case be pulled sidewards, thereby achieving a more stable behavior.

The First Member

The first member (30) is preferably a small and rigid flat plastic piece that is to be connected to the surface of the luggage (10). Other materials can also be used as well. Alternatively, it is possible to mold the first member (30) so that it be integrated on the surface of a luggage having a rigid outer shell. Another possibility is to weld or glue the first member (30) directly on the surface of a luggage.

A piece of fabric (not shown) may be provided for covering the first member (30) when the second member (50) is not connected to it.

The connection between the first member (30) and the luggage (10) may be achieved in various ways. In the preferred embodiment, the first member (30) comprises a plurality of holes (40) for receiving fasteners (42), such as screws or rivets, that are used to connect the first member (30) to a bearing plate (18) inside the luggage (10). The holes (40) of the first member (30) may be chamfered to hide the head of the fasteners (42). The bearing plate (18) is rigidly connected on the side of the inner frame (12) of the luggage (10). The holes of the bearing plate (18) are in registry with the holes (40) of the first member (30). Of course, holes are also provided through the trim or the rigid shell for the insertion of the fasteners (42). It can also be a portion of the frame (12) itself. The bearing plate (18) is used, for instance, whenever the frame (12) is not large enough to accommodate the first member (30), if the conventional handle of the luggage (10) is in the way or if the first member (30) has to be located close to the edge of the luggage (10) and that the frame (12) is too far from it.

The Second Member

Figure 7:
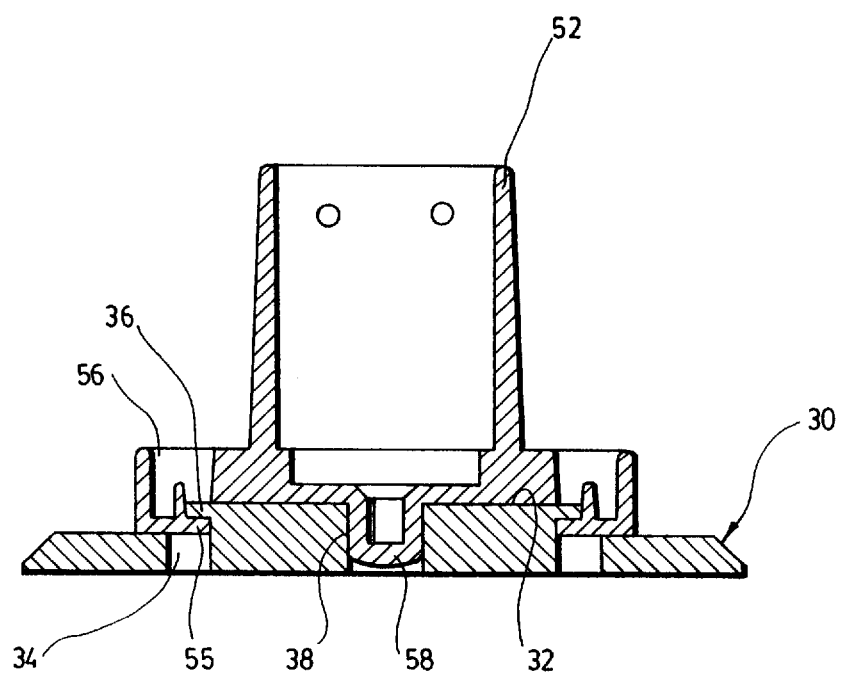
FIG. 7 is a cross-sectional view of the first and second members according to line VII—VII of FIG. 2, showing the first and the second member when connected together.

The second member (50) may be divided in two portions: a rigid base portion (52), made for example of plastic, that is to be connected to the first member (30), and a hand-grip (60), which is preferably rigid and collapsible. The base portion (52) and the hand-grip (60) are either connected to each other or molded together. In the preferred embodiment, as shown in FIGS. 7 and 8, the base portion (52) and the hand-grip (60) are two parts manufactured separately. They are subsequently connected together by means of rivets (70).

As aforesaid, the hand-grip (60) is preferably collapsible. However, it can be made of only one piece (not shown). In the preferred embodiment, and as best shown in FIGS. 7 and 8, the hand-grip (60) ends with a closed loop (62) made for example of a rigid plastic. Alternatively, it may end with only a straight or curved bar (not shown) instead of the closed loop (62).

The telescopic handle (64) may comprise a sleeve (66) and a sliding inner element (67) made for example of aluminum. The user may choose between a first and a second position by pressing a locking knob (68) and moving the inner element (67) to the desired position. Of course, other kinds of telescopic handles and materials may be used instead of the one shown and described herein.

The Connecting Means

The connecting means is used for removably connecting the second member (50) to the first member (30) in a locking engagement, which means that the first (30) and the second member (50) are attached together so that the luggage may be pulled or otherwise moved by one hand of the user. This may be achieved by various arrangements. In the preferred embodiment, this is done by inserting the second member (50) on the first member (30) and then pivoting the second member (50) for half a turn to engage parts that interconnectably cooperate. Although they are not shown in the drawings, various other arrangements are possible for removably connecting the second member (50) to the first member (30) in a locking engagement. One can be the lateral sliding on the second member (50) in opposite and parallel guides extending on the first member (30). Another possibility is to screw a threaded portion projecting under the second member (50), or alternatively from the first member (30), to a threaded bore in the opposite member. A further possibility is to have magnets or pins with tabs to removably lock the members together.

Figure 3:
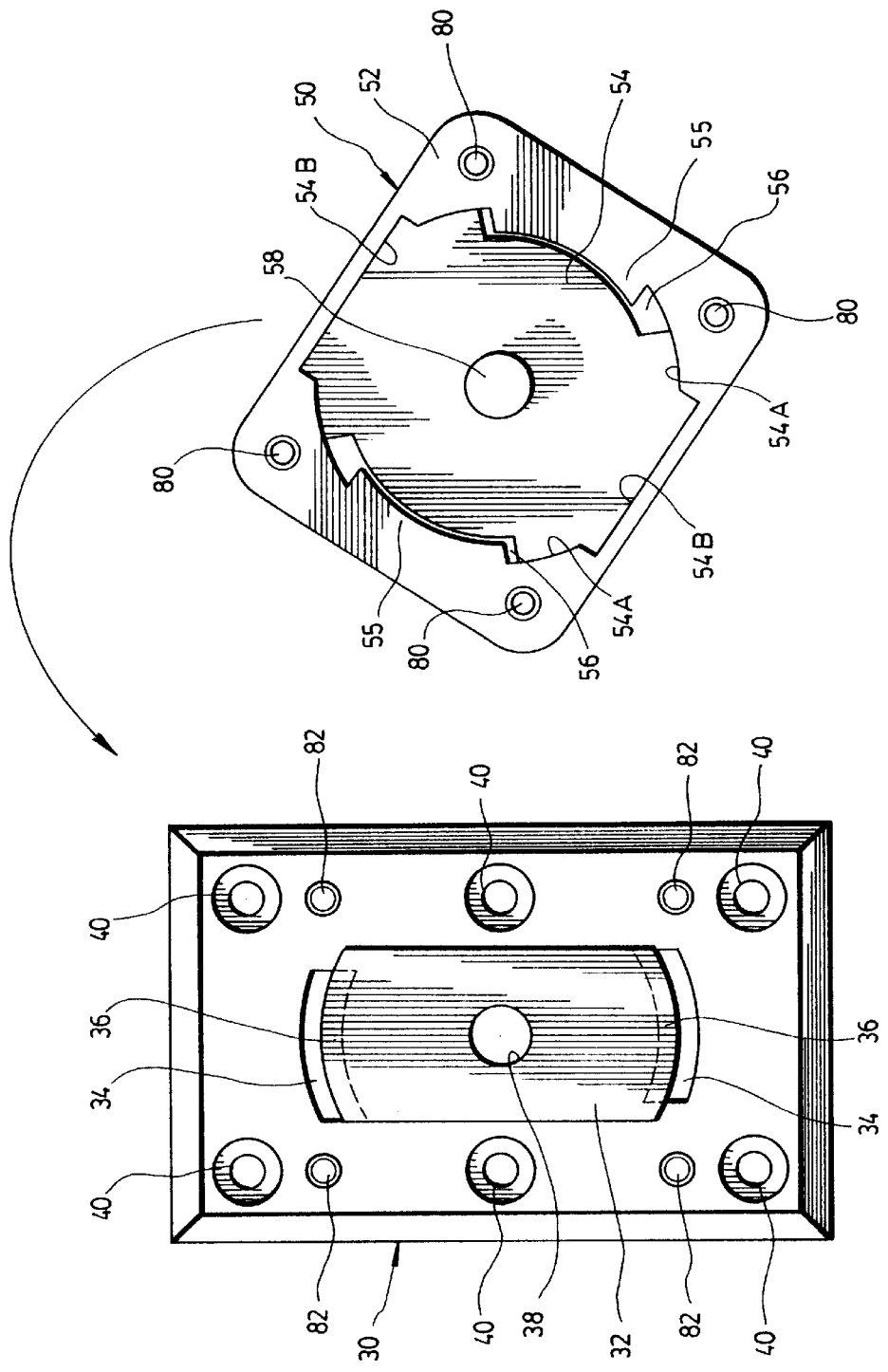
FIG. 3 is an exploded view of the assembly of FIG. 1, showing the top of the first member and the bottom of the second member.

FIG. 3 shows the connecting means according to the illustrated preferred embodiment of the present invention. As aforesaid, the connection is done by inserting the second member (50) on the first member (30) and then pivoting the second member (50) for half a turn to engage parts that interconnectably cooperate. To do so, the first member (30) comprises a rectangular projecting part (32) with rounded ends and projecting from the first member (30) of about 5 mm. Two opposite and slightly offset slots (34) are respectfully juxtaposed to the ends of the rectangular projecting part (32). Each slot (34) forms a flange (36) with the corresponding end of the rectangular projecting part (32), as best shown in FIG. 7.

FIG. 3 also shows the bottom of the second member (50), more particularly of the base portion (52). It comprises a flanged socket (54) that is adapted to receive the rectangular projecting part (32) of the first member (30). of course, one can choose to provide the rectangular projecting part (32) on the second member (50) and the socket (54) on the first member (30).

The socket (54) of the preferred embodiment has a particular shape. It is provided with two opposite curved portions (54A) and two opposite straight portions (54B). The bottom of the socket (54) is flat and its depth is equivalent to the height of the rectangular projecting part (32). The socket (54) is said to be flanged because it is provided with two opposite flanges (55), both slightly offset with reference to a longitudinal axis, and projecting inwardly from a corresponding curved portion (54A). Slots (56) are respectfully provided under one corresponding flange (55).

In use, the second member (50) is inserted over the first member (30) so that the flanges (36) of the rectangular projecting part (32) be juxtaposed to a corresponding straight portion (54B) of the socket (54). An alignment peg (58) projecting outwardly from the center of the socket (54) may be provided to help the user with the alignment. The peg (58) is adapted to fit in a corresponding alignment hole (38) on the top of the rectangular projecting part (32). Of course, the position of the peg (58) and the corresponding hole (38) may be inverted. The connection of the first (30) and the second member (50) is achieved by rotating the second member (50) for half a turn, for example in the clockwise direction. This movement brings each flange (36) over a respective flange (55) of the socket (54) in a sliding relationship. It is possible to design the parts with a slight interfering tolerance to generate a frictional resistance when rotating the second member (50). The slots (34, 56) allow the flanges (36, 55) to slightly deform outwardly and give way to the other corresponding flange. A full locking engagement is achieved when both corresponding flanges (36, 54) are aligned with each other.

Preferably, one side of the flanges (36) of the first member (30) is closed and forms a stopper so that the side end of one corresponding flange (55) in the second member (50) abuts the stopper when the first (30) and the second member (50) are fully locked together. Of course, the stoppers on the first member (30) are diametrically opposite.

The connecting arrangement of the preferred embodiment is further enhanced by a plurality of small bosses (80) that slide into corresponding shallow bores (82) when the first (30) and the second member (50) are fully locked together. When the second member (50) is turned relatively quickly in position, a click is produced, thereby indicating to the user that the full locking engagement is achieved.

Although a preferred embodiment of the invention has been described in detail herein and illustrated in the accompanying drawings, it is to be understood that the invention is not limited to this precise embodiment and that various changes and modifications may be effected therein without departing from the scope or spirit of the present invention.

What is claimed is:

1. A removable handle assembly for luggage, the assembly comprising:

two rigid members, one being a first rigid member connectable to the luggage, and another being a second rigid member comprising a hand-grip;

an alignment peg projecting from one of the two members and insertable into a corresponding alignment hole provided in the other of the two members;

a plurality of bosses projecting from one of the two members and insertable into shallow bores provided on the other of the two members, when the two members are in a locking engagement;

a connecting means for removably connecting the second member to the first member in a pivot locking engagement, the first and the second member being in locking engagement by adjoining the second member with the first member and pivoting the second member, the connecting means comprising:

a projecting part outwardly projecting from one of the two members, the projecting part comprising at least two flanges; and a socket located in the other of the two members to receive the projecting part when the first and the second member are adjoined, the socket comprising at least two flanges, each corresponding to one flange of the projecting part to imbricate therewith upon pivoting of the second member with reference to the first member.

2. A removable handle assembly according to claim 1, wherein the hand-grip comprises a telescopic portion.

3. A removable handle assembly according to claim 2, wherein the hand-grip comprises a closed loop at a free end thereof.

4. A removable handle assembly according to claim 1, wherein a slot is provided under each flange of the first and the second member for allowing the opposite corresponding flange to deform outwardly when the first and the second member are in locking engagement.

5. A removable handle assembly according to claim 1, further comprising a bearing plate connectable on a side of a frame of the luggage for receiving the first member.

6. A removable handle assembly according to claim 5, wherein the first member comprises a plurality of holes in registry with corresponding holes of the bearing plate for connecting the first member to the bearing plate by means of fasteners.

* * * * *